Patented Jan. 5, 1932

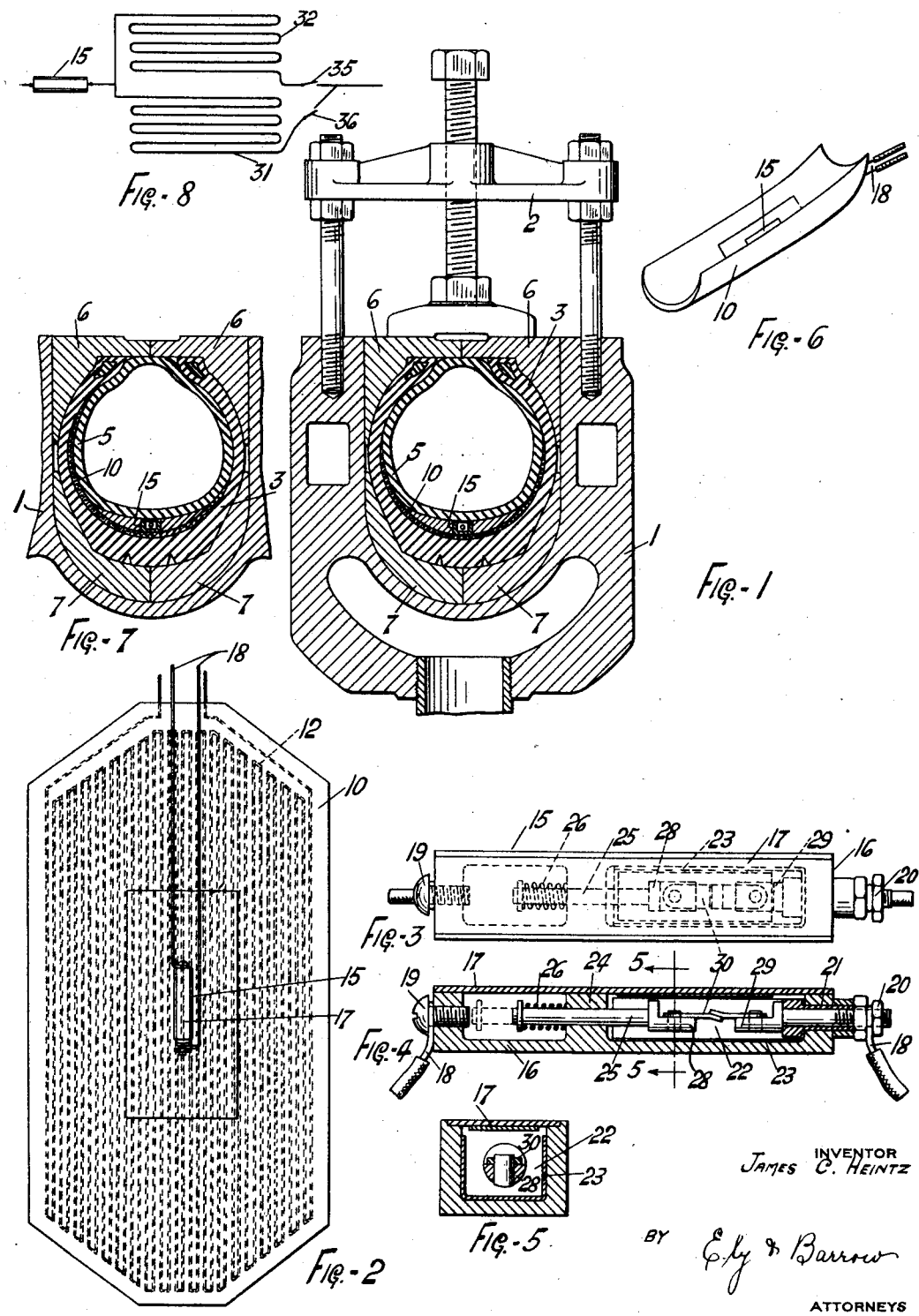

1,839,877

UNITED STATES PATENT OFFICE

JAMES C. HEINTZ, OF LAKEWOOD, OHIO

REPAIR VULCANIZER

Application filed February 27, 1931. Serial No. 518,603.

The present invention relates to the repair of automobile tires, and particularly to a new and improved apparatus for the vulcanization of carcass repairs on large pneumatic tires where it is especially desirable and advisable to apply a vulcanizing heat to both the interior and exterior of the tire in order to secure adequate vulcanization. In the repair of large tires, to which the present invention is particularly designed and adapted, the heat supplied from the exterior heated or steam jacketed mold will not penetrate into the tire sufficiently to effect a thorough cure of the inner regions of the tire carcass, so that the inner plies of the repair are not adequately cured at the time that the exterior portions of the tire have been vulcanized.

The invention also contemplates the new and useful process of vulcanizing repair patches on pneumatic tires, which comprises the step of applying auxiliary heat to the interior of the tire at its tread or thickest portion until the entire mass of the tire is brought to vulcanizing temperature; then shutting off the heat from the interior of the tire and continuing the application of heat to the exterior of the tire until vulcanization of the whole repair section is completed. The invention is broad enough to include the reversal of the above, namely, the application of the auxiliary heat to the exterior of the tire.

The present invention is designed to apply heat to the inner surface of the tire to a sufficient degree to vulcanize the interior portions of the repair in conjunction with the heat which is applied to the exterior of the tire, either by steam jackets about the vulcanizer or by other means. In the prevailing practice of vulcanizing repairs it is customary to insert an expansible core, usually an air bag within the interior of the tire to exert the requisite pressure upon the tire during vulcanization. The present invention relates to a heated pad or insert adapted to be placed between the air bag and the tire to supply the necessary heat, without interfering with the even distributed pressure exerted through the air bag.

In order to accomplish the objects of the invention, it is necessary to employ a thin, flexible pad with a device preferably located in the pad, by which the application of heat may be discontinued when the temperature on the interior of the tire has reached the point at which vulcanization is to be effected. Attempts have been made to accomplish this result by the use of thermostatic control devices in the shield or pad, but in the limited space available it has been impossible to provide thermostatic control devices of sufficient accuracy and sensitiveness to accomplish the desired result. Such thermostatic devices have also been too liable to breakage or loss through mishandling or rough usage, and have been expensive.

The device and apparatus of the present invention obviates the objections and insufficiencies of the prior art devices. It operates effectively to supply the correct degree of heat to the interior of the tire, and to discontinue the application of heat at the time when the temperature in the interior of the tire has reached the proper point. The pad or flexible heating element in combination with the heat control device makes a very effective device for the purpose. The device is inexpensive and cannot be easily injured, so that it is admirably suited for the purposes of the invention. The heat control element is small in bulk and cannot be gotten out of order. It is believed the invention has supplied in a highly satisfactory and advantageous manner the demand for a practical and operative means for vulcanizing and controlling the temperature within the interior of a tire casing undergoing repair vulcanization.

The objects set forth above and other objects and advantages will be apparent upon a further disclosure of the invention, it being understood that the invention is illustrated in its best known or preferred form, and that details thereof are not necessarily essential. Modifications and variations may be made in specific embodiments of the invention, and such changes and modifications are understood to be covered herein.

In the drawings:

Figure 1 is a cross sectional view through a complete vulcanizing unit assembled in operative position with a tire in place therein;

Figure 2 is a plan view of the interior heating element or pad which is employed;

Figure 3 is a plan view of the heat controlling element;

Figure 4 is a longitudinal section thereof;

Figure 5 is a cross section on the line 5—5 of Figure 4;

Figure 6 is a reduced perspective view of the flexible heating element or pad;

Figure 7 is a modified form of device for the repair of tires in which side wall repairs are required; and Figure 8 is a diagram showing the wiring in the device of Figure 7.

In the drawings a conventional form of sectional repair vulcanizer is indicated at 1, this being of the steam jacketed type for the application of heat to the exterior of the tire. The clamping devices usually employed are shown at 2, and the tire at 3. Within the tire is placed the usual sectional repair bag 5, which is of the fluid, expansible type. The bead flanges or plates are indicated at 6, and the tread ring at 7. It will be understood that these parts are of any usual or preferred form and may be varied. They form, with the flexible heating pad, a complete operative combination by which the vulcanization of sectional repairs is carried on.

The flexible heating pad is indicated as a whole by the numeral 10, and is composed of one or more layers of fabric with layers or coatings of rubber, so that the pad is flexible throughout, and readily conforms to the interior surface of the tire, and transmits the fluid pressure from the air bag to the tire. The heat is applied to the pad, and then to the interior of the tire by means of wiring indicated at 12, which is distributed throughout the pad.

Located at any suitable point, preferably in the center of the pad is the heat control element 15. This is in the form of a cartridge or housing 16, having a removable cover 17 on the inner surface of the pad. In ordinary practice the rubber coating on the interior of the pad will soften and cover the edges of the cover so that it may be turned back to expose the interior of the housing for reloading and resetting.

A part of the circuit which supplies the current for the heating coil 12 is constituted by the wires 18 which lead to opposite sides of the housing 16, where they are attached to binding posts 19 and 20. One of the posts, shown here as the post 20, is insulated from the housing by the sleeve 21, while the other is attached directly to the housing. Located within the housing is the chamber 22 which is surrounded by insulation 23. In a midwall 24 in the housing, is located the sliding rod 25, which is urged outwardly by the coil spring 26. To the end of the rod 25 is attached the head 28, and to the post 20 is attached the head 29. Over pins in the heads is carried the metallic fusible link 30 which is adapted to melt when the temperature in the pad reaches the desired point for vulcanization. This point may be governed as desired, but for usual purposes the link is constituted to release at approximately 260° F., it being possible to control to point of fusion within one or two degrees. When the requisite temperature is reached the fusible link will give way and the contact will be broken by the tension in the spring 26.

In the operation of the device it has been found that when the combined effects of the heat applied to the exterior of the tire and that supplied from the interior of the tire by the heat from the flexible heating pad have raised the temperature in the pad to the desired temperature, that vulcanization of the whole repair patch will be completed. The repaired section will be thoroughly vulcanized throughout, and the resulting repair is better and more permanently effected.

It is sometimes advisable to provide for the repair of the tire along the sidewall as well as in the tread area, and for this purpose the flexible heating pad may be altered as shown in Figure 7, in which the pad is carried over the sidewall area as shown. In this case two separate wiring units may be provided for, as shown in Figure 8 at 31 and 32, the fusible link being located at the center of the tread portion as before. Switches 35 and 36 may be incorporated in the separate circuits as shown, so that either or both sections of the heated pad may be employed.

It will be seen that the invention contemplates a new and radical departure in the construction and operation of repair vulcanizers. The heated flexible pad or shield is so arranged that it will supply the requisite heat for bringing the interior of the tire to the vulcanizing temperature. This temperature will not be reached in the interior of the pad until a corresponding temperature has been reached throughout the thicknesses of the tire structure. When the fusible link gives way, the operator knows that the whole structure of the tire has been elevated throughout to vulcanizing temperature, and consequently the repair section will be adequately heated to give the desirable results. After the fusible link has released, the operator continues the application of heat to the exterior of the tire until vulcanization is completed.

In the operation of the device the material of the link is constituted so that it will release and break the circuit at the proper point. This point is largely within the discretion and control of the manufacturer who supplies the links, but it has been found that satisfactory results are obtained at approximately 260° F.

After the vulcanization of a tire is completed and the pad removed, the cover 17 is raised and the old link taken out and a fresh one placed therein for the next operation.

The invention is especially valuable in the curing of repair sections in tires of considerable thickness, where it has been impossible heretofore to secure adequate temperatures in the interior of the tire. This will ensure complete vulcanization without danger of over vulcanization of the exterior of the tire.

What is claimed is:

1. In a tire repair device, the combination of an exterior heated mold, an expansible bag within the tire, and a flexible heated pad between the bag and the tire, and a releasable control device for shutting off the heat from the pad, said control device being located within the pad and constituted by a fusible link.

2. In a tire repair device, the combination of an exterior heated mold, an expansible core within the tire, a flexible pad between the core and the tire, said pad containing electrical wiring, and a fusible link located in the electric circuit and positioned adjacent the inner surface of the tire.

3. In a tire repair device, the combination of an exterior heated mold, an expansible core within the tire, a flexible pad having electrical heating element therein, a housing located in the pad, a fusible link in circuit with the heating element located in the housing.

4. In a tire repair device, the combination of a heated mold in contact with the exterior of the tire, a heating device in contact with the interior of the tire, and a fusible element located adjacent the interior of the tire and adapted to release and discontinue the application of heat to the interior of the tire when the temperature within the tire reaches the point of vulcanization.

5. In a tire repair device, the combination of a heated mold in contact with the exterior of the tire, an electrical heating device in contact with the interior of the tire, and a fusible element located adjacent the interior surface of the tire and adapted to break the circuit to the heating device when the temperature within the tire reaches the point of vulcanization.

6. In a tire repair device, a flexible heating pad adapted to be placed within a tire to be repaired, wiring within the pad, a housing and a fusible link within the housing and in circuit with the wiring.

7. In a tire repair device, a pad of flexible material adapted to the interior of a tire to be repaired, wiring within the pad, a fusible link also located in the pad and in circuit with the wiring.

8. In a tire repair device, a pad of flexible material adapted to the interior of a tire to be repaired, wiring within the pad, a housing embedded within the pad, a fusible link in the housing and in circuit with the wiring.

9. In a tire repair device, a pad of flexible material adapted to the interior of a tire to be repaired, wiring within the pad, a housing embedded within the pad, a fusible, replaceable link in the housing, and in circuit with the wiring.

10. The process of vulcanizing repair patches on tires comprising the steps of applying the major portion of the heat for vulcanization from one side of the tire, applying auxiliary heat to the other side of the tire at its tread portion, shutting off the auxiliary heat when the whole mass of the tire has reached vulcanizing temperature, and continuing the application of heat from the one side of the tire until vulcanization is completed.

11. The process of vulcanizing repair patches on tires comprising the steps of applying the major portion of the heat for vulcanization from the exterior of the tire, applying auxiliary heat from the interior of the tire at its tread portion, shutting off the auxiliary heat when the whole mass of the tire has reached vulcanizing temperature, and continuing the application of heat from the exterior of the tire until vulcanization is completed.

12. In a tire repair device, a pad of flexible material adapted to the interior of a tire to be repaired, the pad extending over the tread area and a side-wall area of the tire, separate heating circuits in the tread and side-wall areas, and means for controlling said circuits independently on one another.

JAMES C. HEINTZ.